May 28, 1946.　　A. W. OEHLER ET AL　　2,401,178
ADJUSTABLE V-BELT SHEAVE
Original Filed Feb. 19, 1944　　2 Sheets-Sheet 2
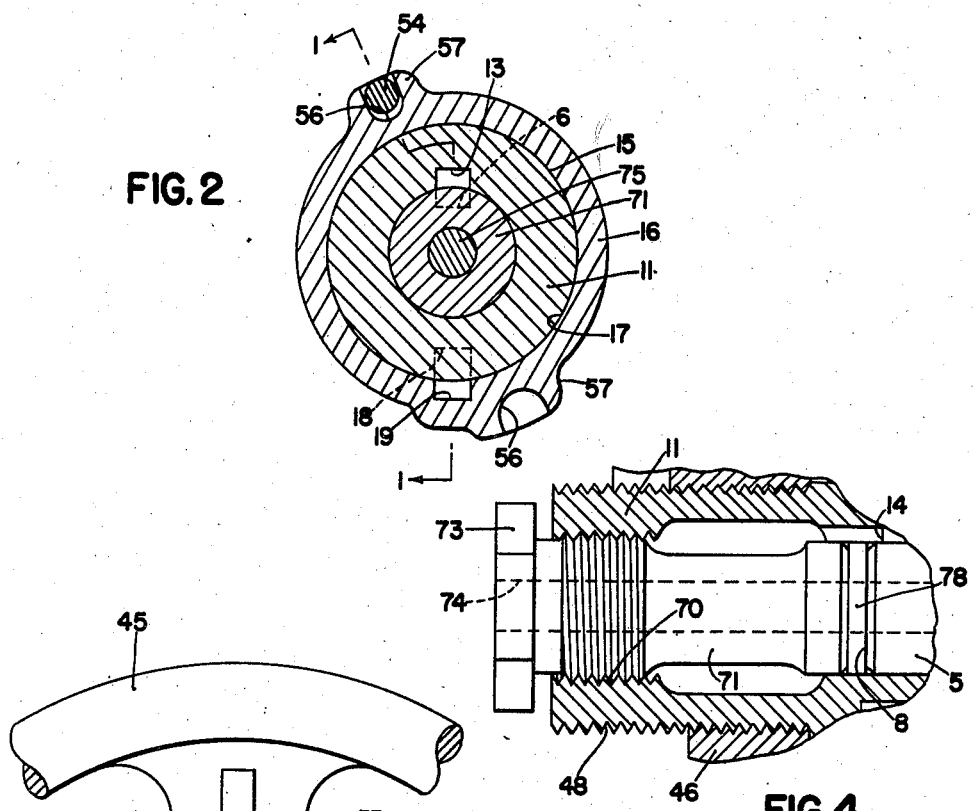
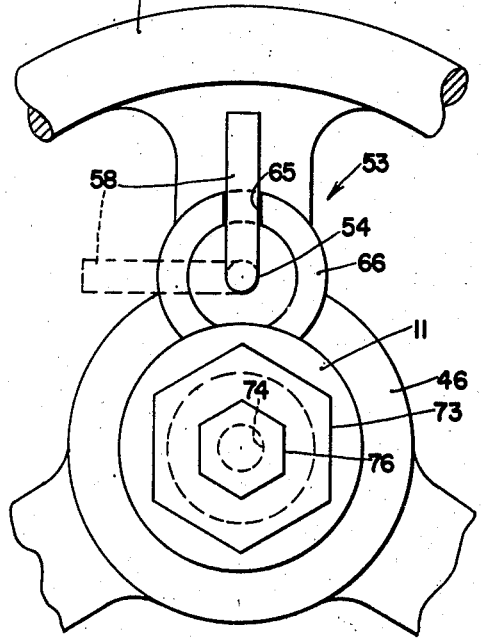
INVENTORS
Alvin W. Oehler and
BY
ATTORNEYS Patented May 28, 1946

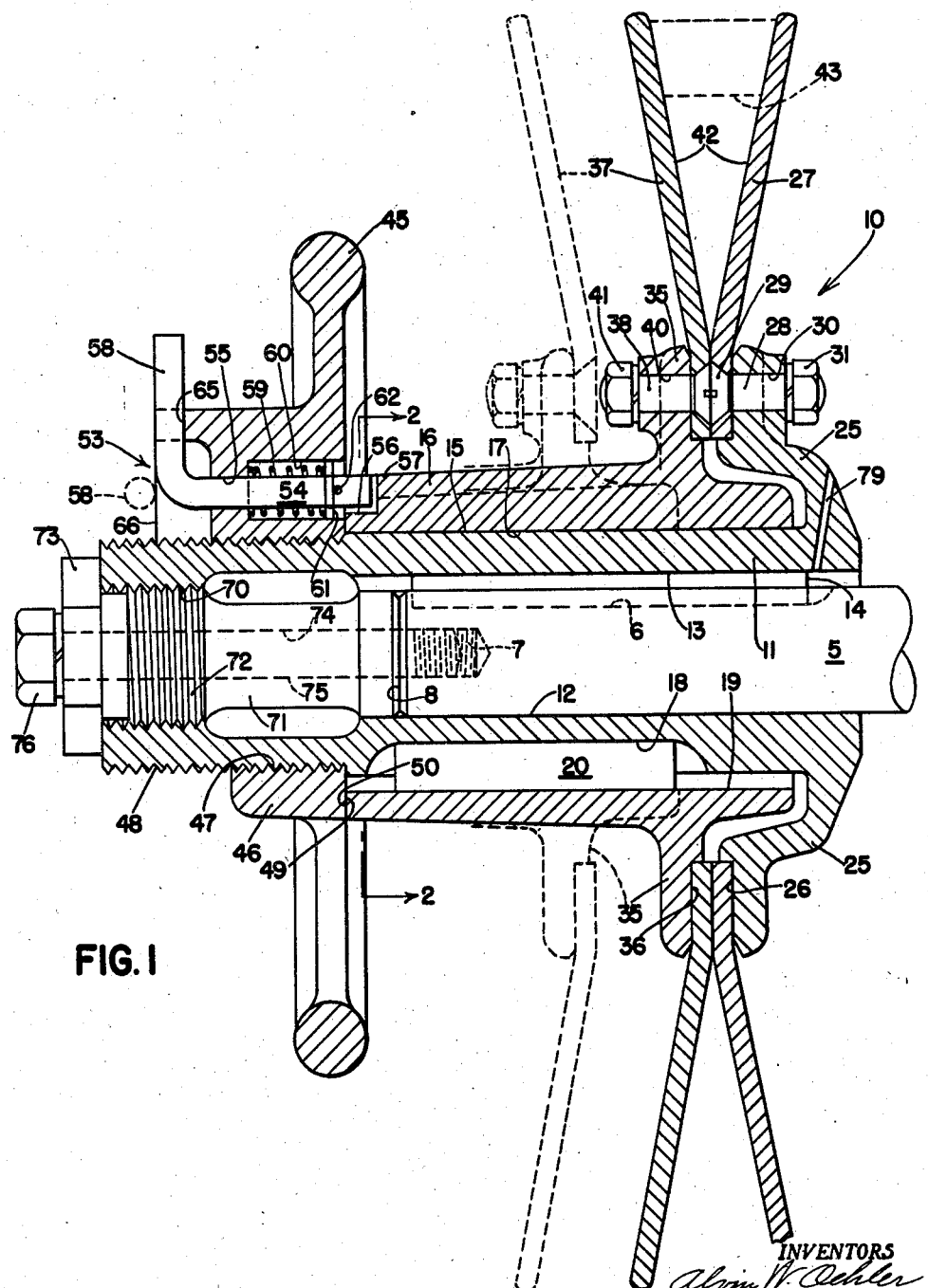

2,401,178

UNITED STATES PATENT OFFICE 2,401,178

ADJUSTABLE V-BELT SHEAVE

Alvin W. Oehler and Eric J. Johnson, Moline, Ill., assignors to Deere & Company, Moline, Ill., a corporation of Illinois Original application February 19, 1944, Serial No. 523,150. Divided and this application December 9, 1944, Serial No. 567,474

5 Claims. (Cl. 287—53)

The present invention relates generally to power transmitting mechanism and more particularly to V-belt sheaves of the adjustable type comprising a pair of opposed conical surfaces adapted to receive therebetween a flexible endless power transmitting belt having inwardly converging surfaces adapted to engage the opposed conical surfaces of the sheave, the effective diameter of the latter being adjustable by shifting the conical surfaces axially relative to each other. The principal object of our invention relates to the provision of an adjustable sheave of simplified and improved design, which is inexpensive to manufacture but which is efficient in operation, strong and durable. Another object relates to the provision of a self-contained adjustable sheave, which can be quickly and easily mounted on the end of a driving or driven shaft and having novel and improved means for securing the sheave to the end of said shaft, which securing means is also adaptable for quickly and easily removing the sheave from the shaft. This application is a division of our co-pending application, Serial No. 523,150, filed February 19, 1944.

These and other objects and advantages of our invention will be apparent to those skilled in the art after a consideration of the following description, in which reference is had to the drawings appended hereto, in which Figure 1 is a sectional view of an adjustable V-belt pulley embodying the principles of our invention, taken along an axial line indicated by 1—1 in Figure 2.

Figure 2 is a sectional view taken along a radial line 2—2 in Figure 1.

Figure 3 is a fragmentary end elevational view.

Figure 4 is a fragmentary sectional view taken axially through the outer end of the pulley hub and showing the securing means adapted for removing the hub from the shaft.

Referring now to the drawings, the shaft is indicated by reference numeral 5 and it can be either a driving or a driven shaft. It is provided with a keyway 6 extending axially inwardly from the end of the shaft and also an internally threaded bolt-receiving recess 7 in the end of the shaft, the outer end being indicated by reference numeral 8.

The adjustable sheave assembly is indicated in its entirety by reference numeral 10 and comprises an inner main hub 11 having an internal aperture 12 adapted to slidably fit over the end of the shaft 5 and having an axially extending keyway 13 disposed in registry with the keyway 6 in the shaft for receiving a key 14 adapted to secure the hub 11 to the shaft 5 to prevent relative rotation therebetween. The hub 11 is provided with a smooth cylindrical outer surface 15, on which is slidably mounted an outer hub 16, having a smooth interior surface 17 slidable on the outer surface 15. The inner hub 11 is provided with an axially extending keyway 18 in the outer surface 15, disposed in registry with an axially extending keyway 19 in the inner surface 17 of the outer hub 16, the keyways 18 and 19 being adapted to receive a key 20.

The inner hub 11 is provided with a flange portion 25 extending generally radially outwardly from the inner end thereof, having an annular recess 26 in the outer portion of the flange 25 adapted to receive a conical sheave member 27. The conical member 27 is rigidly fixed to the flange 25 by means of a plurality of securing bolts 28, having countersunk heads 29 engaging the inner edge of the conical section 27 and extending through peripherally spaced apertures 30 in the flange 25, and secured thereto by suitable nuts 31.

The outer hub 16 is provided with a radially extending flange portion 35 having an annular recess 36 in the outer portion thereof disposed in opposed relation to the recess 26 and adapted to receive the inner edge of a second conical sheave section 37, which is secured to the flange 35 by means of countersunk bolts 38 disposed within peripherally spaced bolt apertures 40 in the flange. The bolts 38 are rigidly secured by nuts 41.

The sheave sections 27, 37 have a pair of opposed conical driving surfaces 42, which diverge radially outwardly and are adapted to receive therebetween a V-belt indicated by reference numeral 43, in a manner well-known to those skilled in the art.

The position of the outer hub 16 is controlled by means of a manually actuated control wheel 45 having a hub 46 provided with internal threads 47 adapted to engage the outer end of the inner hub 11, which is extended appreciably beyond the end 8 of the shaft 5 and is threaded on its outer surface as indicated by reference numeral 48. The inner end of the hub 46 of the control wheel 45 has a radially disposed face 49 adapted to engage the radially extending face 50 of the outer end of the outer hub 16, so that the position of the control wheel 45 determines the spacing between the conical faces 42.

The hand wheel 45 is securable in axially adjusted position by means of a latch mechanism indicated in its entirety by reference numeral 53 and comprising a latch pin 54 disposed generally parallel to the axis of rotation of the assembly and extending through an aperture 55 in the hub 46. The inner end of the latch pin 54 is projectable into any of several recesses 56 provided in suitable bosses 57 formed in the end of the outer hub 16. The latch pin 54 is provided with a handle portion 58 turned at right angles to the pin 54, by means of which the pin 54 can be retracted axially outwardly from the recesses 56. It will now be evident that with the latch pin 54 in retracted position, the wheel 45 can be rotated relative to the hub 16 to adjust the latter axially along the hub 11, but when the desired position of adjustment is attained, the latch pin 54 can be inserted into one of the recesses 56, thereby preventing any further rotation of the wheel 45 on the threads 48, since the hub 16 is prevented from any rotation on the inner hub 11 by the key 20. Thus, the entire sheave structure including the three hubs 11, 16, 46 is rigidly locked together by the latch pin 54 and thus turns with the shaft 5 as a unit.

The latch pin 54 is urged into latched position within the recess 56, by means of a helical spring 59 encircling the pin 54 within an enlarged portion 60 of the aperture 55. The spring 59 is stressed in compression behind a washer 61 encircling the latch pin 54 and secured by a suitable pin 62 inserted through a transverse hole in the pin 54. The spring 59 exerts a pressure against the washer 61 and pin 62 tending to force the latch pin 54 into the associated recess 56, but the spring is yieldable to permit the pin 54 to be retracted from the recess 56 by means of the latch handle 58.

Normally, the handle 58 lies in a notch 65 in an annular flange 66 which curves in a circular arc about the axis of the pin 54 and is formed integral with the hub 46. When the handle 58 is in the notch 65, the pin 54 is in latched position within one of the recesses 56, but when the pin is retracted from one of the notches 56, the handle 58 can be turned out of register with the notch 65 and is thereby retained in retracted position by the annular flange 66, in a position as indicated in dotted lines in Figures 1 and 3. Thus, it is not necessary to manually hold the handle 58 in retracted position when making adjustments of the hand wheel 45.

The means for securing the inner hub 11 on the end of the shaft 5 will now be described. The outer end of the inner surface 12 of the hub 11 is threaded as indicated at 70 to receive a bushing 71 which is threaded at 72 to coact with the thread 70. The bushing 71 is provided with a hexagonal head 73 adapted to receive a wrench for tightening the head 73 against the outer end of the hub 11. The bushing 71 is apertured at 74 to receive a bolt 75 axially therethrough, the end of the bolt being suitably threaded to engage the threaded recess 7 in the end of the shaft 5. The bolt 75 is provided with a head 76 which engages a washer which in turn engages the head 73 of the bushing 71, whereby the bolt 75 can be tightened to force the inner hub 11 over the end of the shaft 5 until the inner end of the bushing 71 engages the end 8 of the shaft, thereby securely holding the sheave on the shaft 5.

The sheave assembly 10 can be removed from the shaft 5 easily and quickly by removing the bolt 75 and the bushing 71 from the hub 11, inserting a spacing washer 78 (see Figure 4), and replacing the bushing 71. The bushing is then tightened until the end of the bushing bears upon the spacer 78, after which further rotation of the bushing 71 by means of a wrench applied to the head 73 draws the hub 11 off the shaft 5, the outer hub 16, hand wheel 45, and sheave sections 27, 37 also coming off the shaft 5 in assembled relation. A small aperture 79 is provided in the hub 11 near the inner end thereof to receive a nail or small drill which can be inserted in back of the key 14 so that the latter is shifted through the keyway 6 along with the hub 11.

We claim:

1. In power transmitting mechanism, a shaft having a threaded recess in the outer end thereof, a hub non-rotatably mounted on said shaft and having an extension beyond the outer end of the latter, internal threads in said hub extension, a bushing adapted to be inserted into said hub extension and having external threads engageable with said internal threads and a head portion engageable with the outer end of said hub, and a bolt adapted to be inserted through said bushing and engageable with said threaded recess in said shaft, said bolt having a head adapted to engage the outer end of said bushing to draw the latter into abutment with the outer end of said shaft.

2. In power transmitting mechanism, a shaft having a threaded recess in the outer end thereof, a hub non-rotatably mounted on said shaft and having an extension beyond the outer end of the latter, internal threads in said hub extension, a bushing adapted to be inserted into said hub extension and having external threads engageable with said internal threads and a head portion engageable with the outer end of said hub, and having an internal bore, a bolt insertable through said bore and engageable with said recess for securing the hub to the end of said shaft, and a spacer adapted to be inserted between said bushing and said shaft to space the head of said bushing outwardly of said hub to provide for drawing the latter off said shaft by turning said bushing within said internal threads in said hub.

3. In power transmitting mechanism, a shaft, a hub mounted on said shaft and having an extension beyond the outer end of the latter, internal threads in said hub extension, a hollow member adapted to be inserted into said hub extension and having external threads engageable with said internal threads, and threaded means engaging the outer end of said hollow member and extending through the latter and secured to said shaft for drawing said hub on said shaft to an extent limited by said hollow member moving into abutment with said shaft.

4. In power transmitting mechanism, a shaft, a hub mounted on said shaft and having an extension beyond the outer end of the latter, internal threads in said hub extension, a hollow member adapted to be inserted into said hub extension and having external threads engageable with said internal threads, threaded means engaging the outer end of said hollow member and extending through the latter and secured to said shaft for drawing said hub on said shaft to an extent limited by said hollow member moving into abutment with said shaft, and a spacer adapted to be inserted between said hollow member and said shaft to space the outer end of said member outwardly of said hub to provide for drawing the latter off said shaft by turning said member within said internal threads in said hub.

5. In power transmitting mechanism, a shaft, a hub mounted on said shaft and having an extension beyond the outer end of the latter, internal threads in said hub extension, a bushing adapted to be inserted into said hub extension and having external threads engageable with said internal threads, and a head portion engageable with the outer end of said hub, threaded means engaging the outer end of said hollow member and extending through the latter and secured to said shaft for drawing said hub on said shaft to an extent limited by said hollow member moving into abutment with said shaft, and a spacer adapted to be inserted between said bushing and said shaft to space the head of said bushing outwardly of said hub to provide for drawing the latter off said shaft by screwing said bushing into said internally threaded hub.

ALVIN W. OEHLER.
ERIC J. JOHNSON.